June 29, 1937.  A. G. F. WALLGREN ET AL  2,085,240

BEARING

Filed Jan. 22, 1936  5 Sheets-Sheet 1

INVENTOR.
August Gunnar Ferdinand Wallgren
Oscar Simon Fridolf Lundh
BY Jarvis C. Marble
Their ATTORNEY.

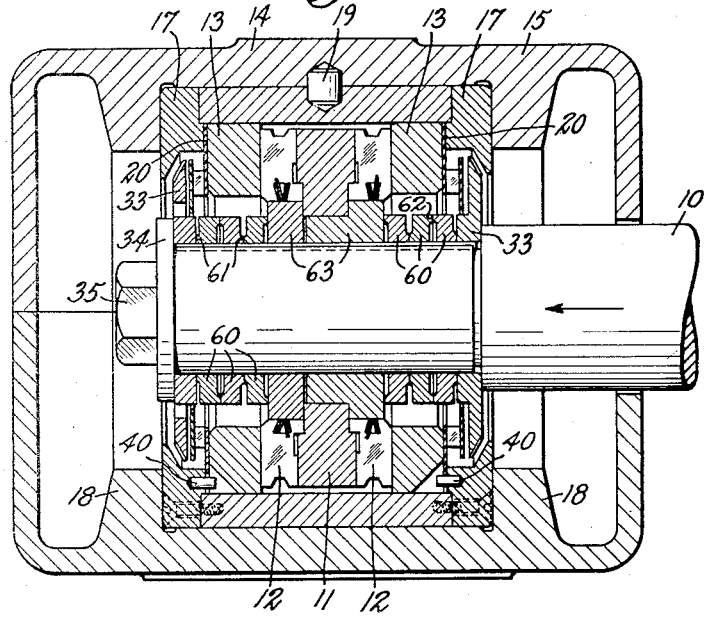

Patented June 29, 1937

2,085,240

UNITED STATES PATENT OFFICE 2,085,240

BEARING

August Gunnar Ferdinand Wallgren, Stockholm, and Oscar Simon Fridolf Lundh, Appelviken, Sweden, assignors to Aktiebolaget Nomy, Stockholm, Sweden, a corporation of Sweden Application January 22, 1936, Serial No. 60,214
In Sweden January 26, 1935

25 Claims. (Cl. 308—73)

Our invention relates to bearings and more particularly to thrust bearings of the sliding block type.

In bearings of this type, it is preferable to provide for universal motion between one of the bearing members and its supporting member, as between the shaft and the rotating bearing member or between the housing and the rotationally stationary bearing member, in order to maintain the cooperating bearing surfaces parallel, even though the shaft is out of alignment. This means for permitting universal movement may be either a ball and socket joint or a Cardan ring provided with diametrically opposed projections on one side of the ring contacting the bearing member and similar projections, on the other side but disposed at 90° with respect to the first mentioned projections, on the other side of the ring contacting the supporting member. However, a ball and socket joint has the serious disadvantage that, because of the large contact surfaces in the joint, it is necessary to overcome a large amount of friction in order for movement between the parts to take place. This drawback is overcome by the use of a Cardan ring, inasmuch as there is only point or line contact between the meeting parts, but this results in a high concentration of load which, particularly in the case of the bearing member, may result in its deformation under high bearing loads.

One of the objects of our invention is to provide a bearing employing a Cardan ring in which provision is made for substantially equally distributing the load around the periphery of the bearing member.

Further objects and advantages will be apparent from the following description considered in connection with the accompanying drawings which form a part of this specification, and of which:

Fig. 9 is a cross-sectional view showing a third embodiment of our invention;

Fig. 10 is a cross-sectional view of a portion of a bearing including a fourth embodiment of our invention;

Figure 1:
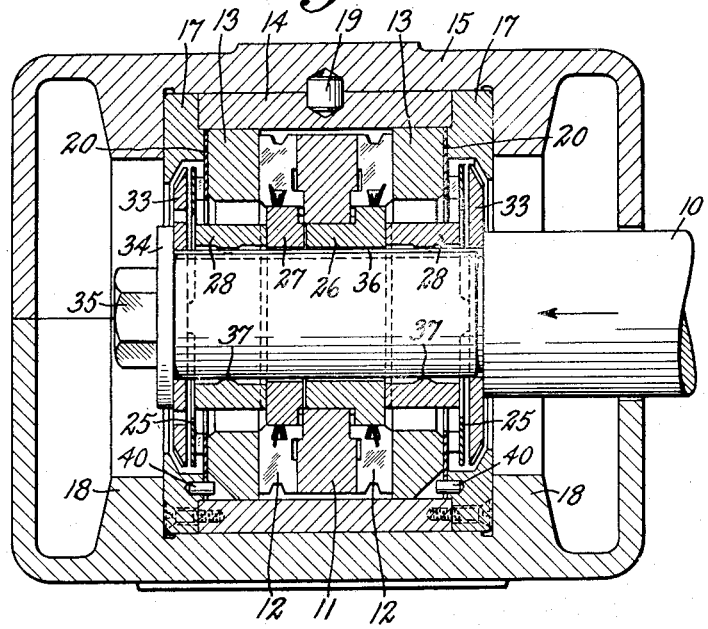
Fig. 1 is a cross-sectional view of one embodiment of our invention.
Figures 2, 3, 4, 5:
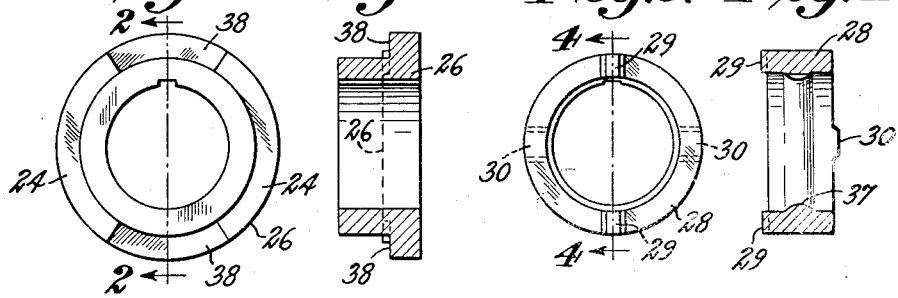
Fig. 2 is a cross-sectional view of an element shown in Fig. 1 and is taken on the line 2—2 of Fig. 3.
Fig. 3 is an end view of the element shown in Fig. 2.
Fig. 4 is a cross-sectional view of a Cardan ring shown in Fig. 1 and is taken on the line 4—4 of Fig. 5.
Fig. 5 is an end view of the ring shown in Fig. 4.

Referring more particularly to the bearing illustrated in Figs. 1 through 5, reference character 10 designates a rotatable shaft which may be subjected to thrust in either direction. Mounted for rotation with shaft 10, in a manner to be subsequently described, is a carrier ring 11 which carries in rotation therewith a plurality of bearing blocks 12. A thrust bearing of this general type is described more in detail in U. S. Patent No. 1,920,727, granted August 1, 1935, to August Gunnar Ferdinand Wallgren. Blocks 12 are formed with bearing surfaces which cooperate with bearing surfaces formed on stationary bearing rings 13. Rings 13 are mounted within a cylindrical member 14 which in turn is supported within a bearing housing 15. Annular rings 17 are disposed within the housing between cylinder 14 and shoulders 18 integral with the housing. A pin 19 serves to position cylinder 14 and prevents rotational movement of the cylinder. Annular plates 20 are located between bearing rings 13 and rings 17 and are held from rotation by means of pins 40. These plates carry additional plates 25 which aid in properly directing the flow of lubricant to the bearing surfaces.

Carrier ring 11 is mounted on an axial portion of a thrust distributing element 26. Element 26 is provided with a flange having a radial surface 24 which bears against a similar surface on one side of ring 11. A second thrust distributing element 27 bears against the other side of ring 11. A pair of Cardan rings 28 are formed with diametrically opposed projections 29 on one end which bear against element 26 and 27, respectively. Cardan rings 28 are formed with additional projections 30 on the opposite end of the ring from projections 29 and disposed at 90° with respect thereto. Projections 30 bear against flanges 33 at either end of the bearing. Flange 33 at the right hand end, as shown in Fig. 1, abuts against a shoulder formed on the shaft while the ring 33 at the left hand end abuts against a washer 34 held in place by means of a nut 35 screwed onto a threaded projection on the shaft. Thus it will be seen that by tightening nut 35 the flanges 33, Cardan rings 28 and the thrust distributing elements 26 and 27 will be forced into mutual contact and the thrust distributing elements will be forced against carrier ring 11. However, the parts should be so dimensioned that, when nut 35 is fully tightened, the aforesaid parts will not be put under high stress, but merely clamped together sufficiently to hold them in place.

Torque is transmitted from the shaft to the carrier ring 11 by means of a key 36 placed in an axial groove in the shaft and engaging key-ways formed in thrust distributing elements 26 and 27. The fit between these thrust distributing elements and the shaft, including the key carried by the shaft, is sufficiently loose so as to allow for wobbling between the shaft and the thrust distributing elements. The inner surfaces of the Cardan rings do not contact the shaft throughout their entire length because of annular projections 37 which are formed on these surfaces, thus allowing greater freedom of movement between the Cardan rings and the shaft.

Thrust distributing elements 26 and 27 are preferably formed with recesses 38 in those portions of their surfaces 24 which are in axial alignment with the projections 29 on the Cardan rings 28. The outer ridges of flanges 33 are preferably formed with conical surfaces, which cooperate with similar surfaces on rings 17 for forcing lubricant to the bearing surfaces, in a manner known per se.

The operation of the above described bearing is as follows, assuming thrust to be imposed upon the shaft 10 in the direction indicated by the arrow. This thrust is transmitted from the shaft to the flange 33 at the right-hand end of the bearing, as viewed in Fig. 1, and from this flange through the projections 30 to the Cardan ring 28. From here it is transmitted through the projections 29 to the thrust distributing member 26. Due to the fact that surface 24 of element 26 is formed with recesses 38 opposite projections 29, this thrust can not be applied to the carrier ring 11 at these points only, even though the thrust is sufficient to slightly deform element 26. On the contrary, the thrust is distributed by the element 26 around substantially the entire periphery of ring 11. This assures that the ring will not be deformed, as it might be if the entire thrust were applied to it at two points only. From the ring 11 the thrust is transmitted to the bearing blocks 12 and through the oil film maintained between the bearing surfaces to the ring 13 at the left end of the bearing. From this bearing ring, the thrust is transmitted through plate 20 to ring 17 and hence to the bearing housing. Thrust in the opposite direction would be transmitted in a similar manner from the shaft to the housing by the members which are the complements of those above catalogued. For either direction of thrust, torque is transmitted from the shaft to the carrier ring 11 by means of the key 36 to the thrust distributing elements 26 and 27 and thence to the carrier ring. Thus, the Cardan rings 28 are not required to transmit any torque.

In the event that shaft 10 is somewhat out of alignment and hence upon rotation wobbles with respect to the bearing housing, the provision of the Cardan rings permits the thrust distributing elements 26 and 27, the carrier ring 11 and the blocks 12 to run true with respect to the stationary bearing rings 13. This means that the shaft must wobble with respect to these members which are carried in rotation with it and this is permitted by virtue of the slight play provided between the elements 26 and 27 and the shaft.

Figure 6:
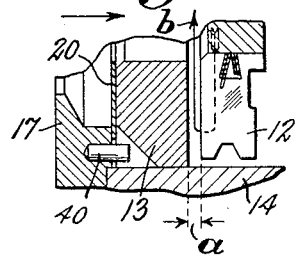
Fig. 6 is a cross-sectional view of a portion of a bearing showing an undesirable condition.
Figure 7:
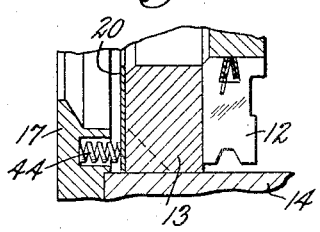
Fig. 7 is a cross-sectional view similar to Fig. 6 but showing an arrangement for overcoming the undesirable condition shown in the preceding figure.

From the above description of operation, it will be apparent that the bearing members on but one side of the bearing are loaded at any particular time and consequently the bearing members on the other side are unloaded. If no special provision was made, this might result in spaces being formed between the bearing surfaces of the blocks and the bearing ring 13 on the unloaded side of the bearing, as is shown in exaggerated form in Fig. 6 and indicated by the letter $a$. These spaces might result in an undesirable circulation of lubricant toward the shaft in the direction indicated by the arrow $b$. In order to prevent the formation of these spaces, a plurality of comparatively light springs 44, shown in Fig. 7, may be provided between rings 17 and the plates 20. On the loaded side of the bearing, these springs are compressed until the plate 20 abuts against the ring 17. However, on the unloaded side, as shown in Fig. 7, these springs force the plate 20 and the bearing ring 13 toward the bearing blocks 12 with just sufficient force to prevent the formation of the spaces $a$ without imposing any appreciable frictional drag on this side of the bearing.

Figure 8:
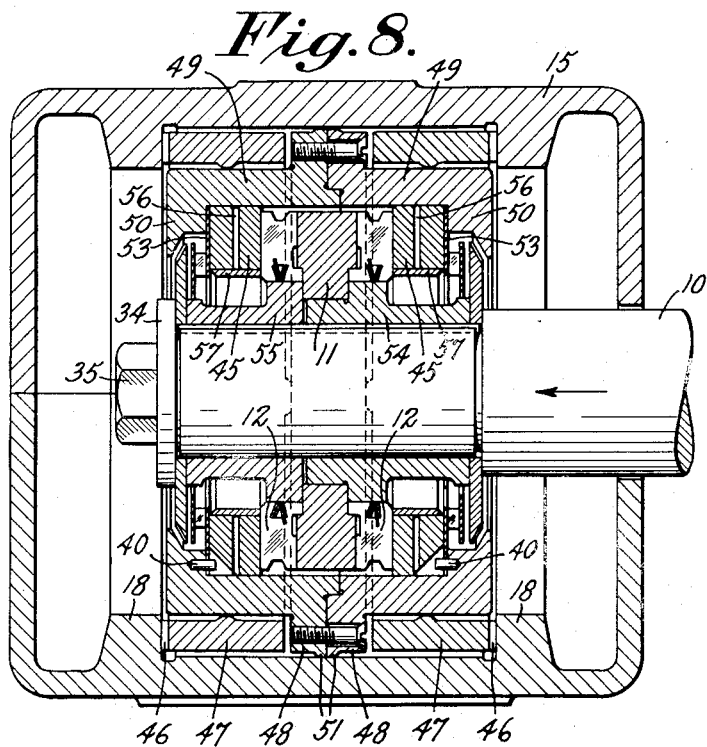
Fig. 8 is a cross-sectional view showing a second embodiment of our invention.

In the embodiment shown in Fig. 8, the Cardan rings are disposed between the rotationally stationary bearing rings 45 and the bearing housing 15, instead of between the carrier ring and the shaft. The projections 46 on the outer ends of the Cardan rings 47 abut against the shoulders 18 of the housing, whereas the projections on the other ends of the Cardan rings, which are disposed at 90° with respect to projections 46, abut against outwardly extending flanges 48 formed on the thrust distributing elements 49. These elements are formed with inwardly extending flanges 50 which abut against the annular plates 53 disposed between them and the bearing rings 45. Flanges 48 are formed with an annular ridge 51 which rests on the interior of the bearing housing, and tiltably supports the elements 49 therein.

The carrier ring 11 is rigidly clamped to the shaft by means of sleeves 54 and 55 which are in turn clamped in place by means of the nut 35. Consequently, the carrier ring 11 and the bearing blocks 12 wobble with the shaft and the bearing rings 45 are permitted to run true with respect to the bearing blocks by virtue of the fact that they also wobble with the shaft and wobble with respect to the housing 15. This wobbling is permitted by the Cardan rings 47 interposed between the thrust distributing elements 49 and the housing.

The thrust distributing elements 49 assure that the thrust will be distributed around substantially the entire periphery of the bearing rings 45. This may be of particular advantage if the rings are weakened at certain places in their periphery by being slotted, as is shown at 56. The purpose of this weakening is to provide unloaded zones in the bearing surfaces for facilitating slight movement of the blocks 12 with respect to the carrier ring 11 upon a reversal in direction of rotation of the shaft, as is explained in detail in U. S. Patent No. 2,012,841, granted August 27, 1935, to August Gunnar Ferdinand Wallgren. If the thrust load acted in two points only of a bearing ring weakened in this nature, it would be very apt to produce undesirable deformations in the ring, which are prevented by the equal distribution assured by the provision of the thrust distributing elements 49. In order to prevent the leakage of lubricant through slots 56, the cylinder sleeves 57 may be placed within bearing rings 45.

The embodiment shown in Fig. 9 is similar to that illustrated in Figs. 1 through 5, with the exception that a different Cardan arrangement is provided. The Cardan rings 28 of the first embodiment are here replaced by means of a plurality of rings 60. Each ring is formed with an axially extending annular shoulder 61 adjacent its inner periphery on one end and a similar annular projection 62 adjacent to its outer periphery on the other end. The rings are so placed that, for instance, a projection 61 on one of the rings abuts against flange 33, projection 62 on two of the rings abuts against each other, projection 61 on the second ring abuts against a similar projection 61 on the third ring, the projection 62 of which abuts against either a spacer ring 63 or directly against the carrier ring 11. These rings permit universal movement between the shaft and the spacer ring 63 by virtue of their resiliency and they act somewhat in the nature of a strong spring. Due to the fact that diametrically opposed projections are not employed, the thrust transmitted from the third ring to the spacer ring 63 is evenly distributed around the entire periphery, wherefore this thrust could be directly applied to the carrier ring 11. The extra spacer ring 63 is employed only so that the dimensions of the parts for a bearing in accordance with this embodiment may be the same as for a bearing in accordance with the first embodiment. While three rings 60 have been shown on either side of the bearing, it is obvious that a greater or lesser number could be employed.

Inasmuch as the universal movement provided by the rings 60 depends upon their resiliency, it is apparent that movement may take place more readily at high loads than at low loads. However, it is more essential that the bearing surfaces are true at high loads than it is at low loads. Nevertheless, if desired, these rings may be so formed as to provide an equal degree of universal movement over a wide range of loads. As shown in Fig. 10, rings 65, 66 and 67 may be provided which are similar to ring 60 but which have different axial lengths and hence different degrees of resiliency. With the arrangement shown in this figure, when operating under a light load, ring 65, and perhaps ring 66, would not be deformed at all, the universal movement taking place by virtue of the deformation of the thinner ring 67. Under heavy loads, the ring 67, and possibly the ring 66, would be immediately deformed until there is contact with the adjacent ring, not only along the surfaces provided by the annular projections, but at other points as well. Under these conditions, the rings 66 and 67, for instance, would act as a single ring, the resiliency of which would be greater than that of either of them alone. Thus, the bearing would be, in this respect, self-adjusting for whatever thrust load might be imposed on it.

Figure 11:
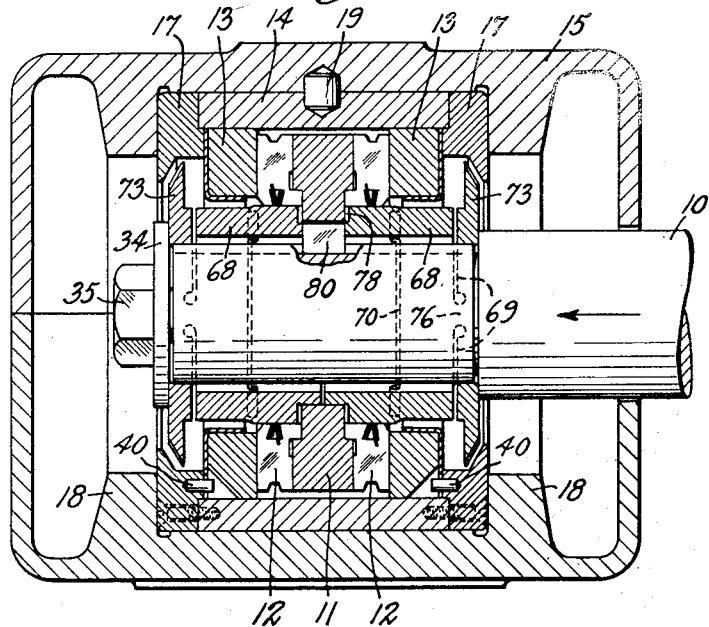
Fig. 11 is a cross-sectional view showing a fifth embodiment of our invention.
Figure 12:
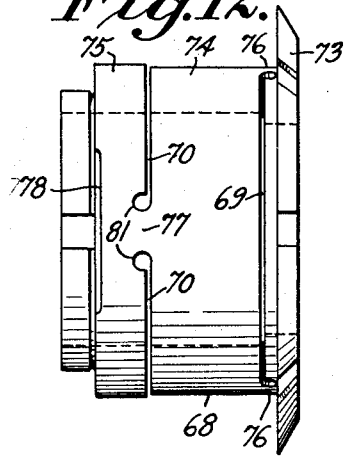
Fig. 12 is an elevational view of an element shown in Fig. 11.

Instead of forming the universal movement means as a plurality of separate rings, as shown in Figs. 9 and 10, it may consist of a single ring element 68, as shown in Figs. 11 and 12. In this embodiment, the flange 33, Cardan ring 28 and thrust distributing element 26, shown in Fig. 1, are combined to form a single integral element provided with pairs of peripheral slots 69 and 70 formed therein and separating the ring 68 into a flange 73 at one end, a central part 74 and a ring 75 at the other end. Flange 73 and central part 74 are connected together by means of diametrically opposed narrow strips of material 76 which interrupt slots 69. These strips 76 correspond to the projections 30 of the Cardan rings shown in Figs. 1, 4, and 5. Central part 74 is connected to end ring 75 by strips 77 which are diametrically opposed to each other and disposed at 90° with respect to strips 76. Strips 77 correspond to projections 29 on the Cardan ring 28 of Fig. 1. The end surface of ring 75, which bears against carrier ring 11 is formed with a recess 78 which corresponds to and performs the same function as recess 38 in thrust distributing elements 26 and 27 of Fig. 1.

In the embodiment shown in Figs. 11 and 12, due to the fact that the end flange, Cardan ring and thrust distributing element are formed in a single integral piece, they need not rest on the shaft which passes therethrough. Consequently, wear between the shaft and these parts is eliminated. Torque is transmitted from the shaft to the carrier ring 11 by means of a key 80 which has sufficient play to permit wobbling of the carrier ring with respect to the shaft. In this embodiment, the universal movement between the carrier ring and the shaft is permitted by virtue of the resiliency of sleeve 68 caused by its being formed with slots 69 and 70. This resiliency may be increased, if desired, by enlarging the slots adjacent to their ends as shown at 81. Consequently, even though the shaft wobbles, the carrier ring 11 and the blocks 21 carried thereby may run true with respect to the bearing rings 13.

Figure 13:
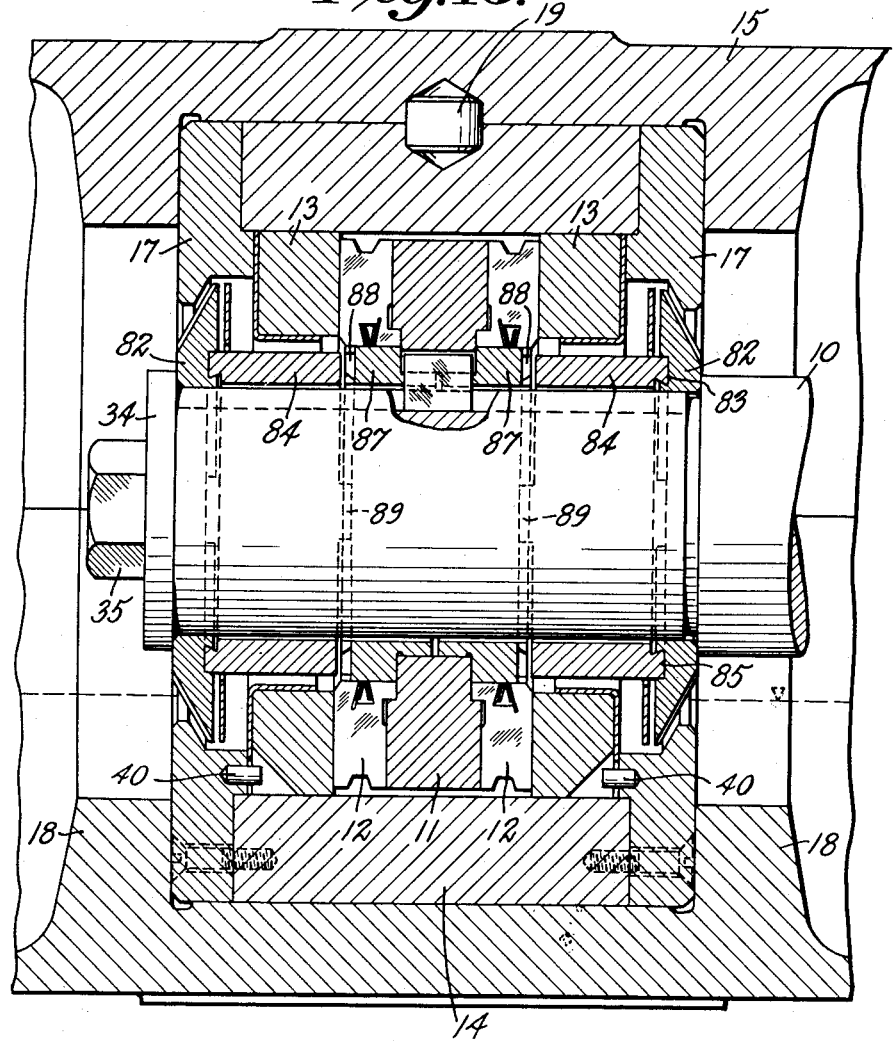
Fig. 13 is a cross-sectional view of another embodiment of our invention.
Figure 14:
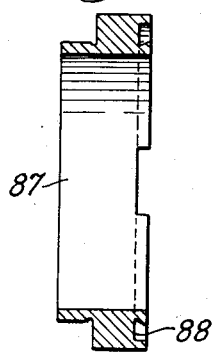
Fig. 14 is a cross-sectional view of an element shown in Fig. 13.
Figure 15:
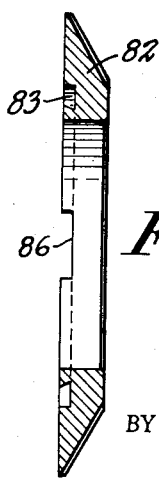
Fig. 15 is a cross-sectional view of another element shown in Fig. 13.

In the embodiment shown in Figs. 13 through 15, the end flange, Cardan ring and thrust distributing element are made in three separate pieces, as is shown in Fig. 1, but they are locked together. End flange 82 is formed with a groove 83 having a dovetail cross section. Cardan ring 84 is formed with diametrically opposed projections 85, likewise having a dovetail shape. Groove 83 is formed with diametrically opposed openings 86, one of which is shown in Fig. 15, through which the projections 85 may be inserted and the flange and the Cardan ring locked together by rotating one of them through approximately 90° with respect to the other. The Cardan ring may be locked to the thrust distributing element 87 in similar manner, the thrust distributing element being provided with an annular groove 88 for receiving the projections 89 on the Cardan ring 84. As described in the other embodiments, projections 89 are disposed at 90° with respect to the projections 85 on the other end of the ring. Sufficient play is provided between the projections on the Cardan ring and the grooves 83 and 88 to permit the necessary movement required between these parts. Inasmuch as the flange, Cardan ring and thrust distributing element are locked together in the manner described, the Cardan ring and thrust distributing element do not bear against the shaft and hence wear is eliminated in the same manner as described in connection with Figs. 11 and 12.

Figure 16:
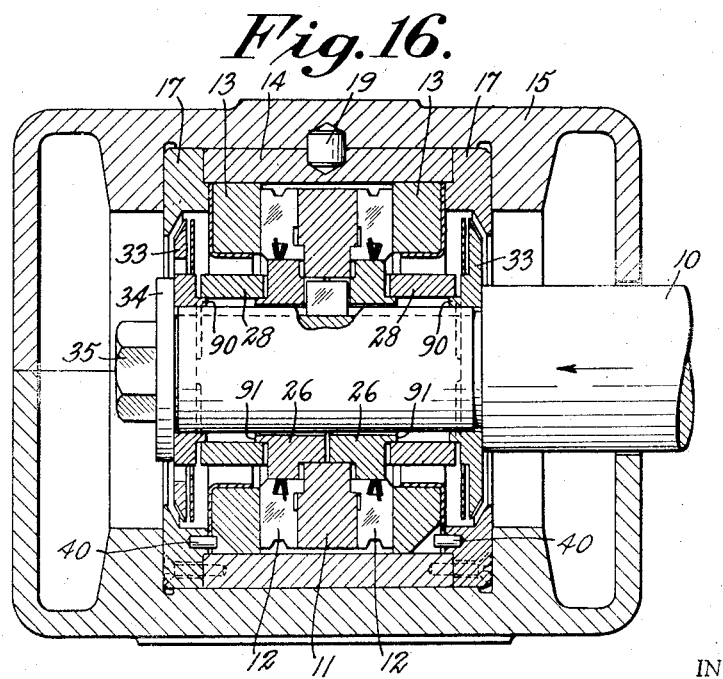
Fig. 16 is a cross-sectional view of still another embodiment of our invention.

In the embodiment shown in Fig. 16, which is similar to that shown in Figs. 1 through 5, the flange 33 is provided with an annular shoulder 90 which fits within the bore of Cardan ring 28. Thrust distributing element 26 is formed with a similar shoulder 91 which also fits within the bore of the Cardan ring. In this manner, neither the Cardan ring nor the thrust distributing element bears against the shaft and hence no wear takes place between them. The material of which shafts are ordinarily made is not hardened and hence not wear resisting. On the other hand, the flange 33, Cardan ring 28 and thrust distributing element 26 may be made of suitable material to resist the wear which takes place between them in the bearing shown in Fig. 16. In other respects, this bearing is similar to that shown in Figs. 1 through 5 and operates in the same manner.

While we have described several more or less specific embodiments of our invention, it is to be understood that this has been done for purposes of illustration only and that our invention is not to be limited thereto but its scope is to be determined by the appended claims viewed in the light of the prior art.

What we claim is:

1. In a thrust bearing for a rotating shaft, a housing, a bearing member mounted for rotation with said shaft, a bearing member mounted in said housing and rotationally stationary with respect thereto, said members having cooperating bearing surfaces, and means for maintaining said surfaces parallel with each other including a Cardan ring having diametrically opposed thrust transmitting projections for supporting one of said members, and a thrust distributing element disposed between said projection and said one of said members.

2. In a thrust bearing for a rotating shaft, a housing, a rotatable bearing member mounted on said shaft, a stationary bearing member mounted in said housing, said members having cooperating bearing surfaces, and means for maintaining said surfaces parallel with each other including a Cardan ring having diametrically opposed projections for transmitting thrust between said shaft and said rotatable bearing member, and a thrust distributing element disposed between said projections and said rotatable bearing member.

3. A bearing as claimed in claim 2 in which said thrust distributing element is located radially inside said bearing surface.

4. A bearing as claimed in claim 2 in which said Cardan ring and said thrust distributing element are arranged directly around said shaft.

5. In a thrust bearing for a rotating shaft, a housing, a first bearing member on said shaft, a second bearing member mounted in said housing and rotationally stationary with respect thereto, said members having cooperating bearing surfaces, and means for maintaining said surfaces parallel with each other including a Cardan ring having diametrically opposed projections for transmitting thrust between said housing and said second bearing member, and a thrust distributing element disposed between said projections and said second bearing member.

6. A bearing as claimed in claim 5 in which said thrust distributing element is located radially outside said bearing surfaces.

7. In a thrust bearing for a rotating shaft, a housing, a bearing member mounted for rotation with said shaft, a bearing member mounted in said housing and rotationally stationary with respect thereto, said members having cooperating bearing surfaces, and means for maintaining said surfaces parallel with each other including a Cardan ring having diametrically opposed thrust transmitting projections for supporting one of said members, and a thrust distributing element disposed between said projections and said one of said members, said thrust distributing element being formed with recesses adjacent to said one of said members in axial alignment with said projections.

8. In a thrust bearing for a rotating shaft, a housing, a rotating bearing member mounted on said shaft and having radial bearing surfaces disposed on opposite sides, rotationally stationary bearing members mounted in said housing and having bearing surfaces cooperating with the bearing surfaces on said rotating bearing members, and means for maintaining said cooperating surfaces parallel with each other including a pair of Cardan rings having diametrically opposed projections for transmitting thrust between said rotationally stationary members and said housing, and a thrust distributing member between the projections on each of said Cardan rings and the corresponding rotationally stationary bearing member, said thrust distributing elements being rigidly secured together.

9. A bearing as claimed in claim 8 in which said thrust distributing elements are tiltably supported in said housing.

10. In a thrust bearing for a rotary shaft, a housing, a bearing member mounted for rotation with said shaft, a bearing member mounted in said housing and rotationally stationary with respect thereto, said members having cooperating bearing surfaces, and means for maintaining said surfaces parallel with respect to each other including a Cardan arrangement for supporting one of said members and means for distributing thrust transmitted through said Cardan arrangement substantially equally around the periphery of said one of said members.

11. In a thrust bearing for a rotary shaft, a housing, a bearing member mounted for rotation with said shaft, a bearing member mounted in said housing and rotationally stationary with respect thereto, said members having cooperating bearing surfaces, and means for maintaining said surfaces parallel with respect to each other including a Cardan arrangement for supporting one of said members and transmitting thrust at diametrically opposed points and means for distributing said thrust substantially equally around the periphery of said one of said members.

12. In a thrust bearing for a rotating shaft, a housing, a rotating bearing member mounted on said shaft and having radial bearing surfaces disposed on opposite sides, bearing members mounted in said housing and having bearing surfaces cooperating with the bearing surfaces on said rotating bearing member, and means for maintaining said cooperating surfaces parallel with each other including a pair of Cardan rings having diametrically opposed projections for transmitting thrust between said shaft and said rotating bearing member, a thrust distributing element between the projections on said Cardan ring and said rotating bearing member, and resilient means for maintaining the rotationally stationary bearing ring on the unloaded side of the bearing in contact with the bearing surface on the corresponding side of said rotating bearing surface.

13. In a thrust bearing for a rotating shaft, a housing, a first bearing member on said shaft, a second bearing member mounted in said housing and rotationally stationary with respect thereto, said members having cooperating bearing surfaces, said second bearing member being formed with a portion of reduced thickness so as to provide a deformable zone, and means for maintaining said surfaces parallel including a Cardan ring having diametrically opposed projections for transmitting thrust between said housing and said second bearing member, and a thrust distributing element disposed between said projections and said second bearing member.

14. In a thrust bearing for a rotating shaft, a housing, a first bearing member on said shaft, a second bearing member mounted in said housing and rotationally stationary with respect thereto, said members having cooperating bearing surfaces, said second bearing member being formed with a slit in a radial plane so as to provide a deformable zone, a sleeve within said second bearing member for preventing leakage of lubricant through said slit, and means for maintaining said surfaces parallel including a Cardan ring having diametrically opposed projections for transmitting thrust between said housing and said second bearing member and a thrust distributing element disposed between said projections and said second bearing member.

15. In a thrust bearing for a rotating shaft, a housing, a bearing member mounted for rotation with said shaft, a bearing member mounted in said housing and rotationally stationary with respect thereto, said member having cooperating bearing surfaces, and means for maintaining said surfaces parallel with each other and for distributing thrust substantially equally around the periphery of one of said members including a thrust transmitting spring member bearing against substantially the entire periphery of said one of said members.

16. In a thrust bearing for a rotating shaft, a housing, a bearing member mounted for rotation with said shaft, a bearing member mounted in said housing, said members having cooperating bearing surfaces, and means for maintaining said surfaces parallel including a plurality of resilient thrust transmitting rings disposed between the rotating bearing member and said shaft, one of said rings bearing against substantially the entire periphery of said rotating bearing member, whereby thrust is evenly distributed therearound.

17. A bearing as claimed in claim 16 in which said rings are formed with different degrees of resiliency.

18. In a thrust bearing for a rotating shaft, a housing, a bearing member mounted for rotation with said shaft, a bearing member mounted in said housing, said members having cooperating bearing surfaces, and means for maintaining said surfaces parallel and for distributing thrust substantially equally around the periphery of the rotating bearing member including an annular member having one end portion fixed with respect to said shaft, an intermediate portion and another end portion bearing against said rotating bearing member, said intermediate portion being connected to said end portion by narrow strips of material.

19. In a thrust bearing for a rotating shaft, a housing, a bearing member mounted for rotation with said shaft, a bearing member mounted in said housing, said members having cooperating bearing surfaces, and means for maintaining said surfaces parallel and for distributing thrust substantially equally around the periphery of the rotating bearing member including an annular member having one end portion fixed with respect to said shaft, an intermediate portion and another end portion bearing against said rotating bearing member, said intermediate portion being connected to said end portions by pairs of narrow strips of material, the strips of each pair being diametrically disposed with respect to each other and disposed at 90° with respect to the strips of the other pair.

20. A bearing as claimed in claim 18 in which the strips are integral with the intermediate portion and with the respective end portions.

21. A bearing as claimed in claim 18 in which the strips are integral with the intermediate portion and are locked in grooves formed in the respective end portions.

22. A bearing as claimed in claim 19 in which the strips are integral with the intermediate portion and with the respective end portions.

23. A bearing as claimed in claim 19 in which the strips are integral with the intermediate portion and are locked in grooves formed in the respective end portions.

24. In a thrust bearing for a rotating shaft, a housing, a rotatable bearing member mounted on said shaft, a stationary bearing member mounted in said housing, said members having cooperative bearing surfaces, and means for maintaining said surfaces parallel with each other including a flange fixed to said shaft, a Cardan ring and a thrust distributing member disposed between said flange and said rotatable bearing member, and means for centering said Cardan ring and said thrust distributing member with respect to said shaft and for maintaining them out of contact with the shaft.

25. In a thrust bearing for a rotating shaft, a housing, a rotatable bearing member mounted on said shaft, a stationary bearing member mounted in said housing, said members having cooperative bearing surfaces, and means for maintaining said surfaces parallel with each other including a flange fixed to said shaft and having an annular collar, a Cardan ring fitting around said collar and having diametrically opposed projections on one end thereof bearing against said flange, and a thrust distributing member between said rotatable bearing member and diametrically disposed projections on the other end of said ring, said thrust distributing member having a collar fitting within said Cardan ring, said collars serving to center said Cardan ring and said thrust distributing member with respect to the shaft and to maintain them out of contact with the shaft.

AUGUST GUNNAR
    FERDINAND WALLGREN.
OSCAR SIMON FRIDOLF LUNDH.